US008615059B2

(12) United States Patent
Mikhemar et al.

(10) Patent No.: US 8,615,059 B2
(45) Date of Patent: Dec. 24, 2013

(54) DISTORTION CANCELLATION IN RADIO RECEIVERS USING I/Q CORRECTION

(75) Inventors: Mohyee Mikhemar, Irvine, CA (US); Hooman Darabi, Laguna Niguel, CA (US)

(73) Assignee: Broadcom Corporation, Irvine, CA (US)

( * ) Notice: Subject to any disclaimer, the term of this patent is extended or adjusted under 35 U.S.C. 154(b) by 274 days.

(21) Appl. No.: 13/071,295

(22) Filed: Mar. 24, 2011

(65) Prior Publication Data

US 2012/0020389 A1    Jan. 26, 2012

Related U.S. Application Data

(63) Continuation of application No. 61/367,825, filed on Jul. 26, 2010.

(51) Int. Cl.
*H03D 1/04* (2006.01)

(52) U.S. Cl.
USPC .......................................................... 375/346

(58) Field of Classification Search
USPC ......... 375/285, 296, 316, 341, 346; 455/63.1, 455/67.13
See application file for complete search history.

(56) References Cited

U.S. PATENT DOCUMENTS

| | | | |
|---|---|---|---|
| 7,035,345 B2 * | 4/2006 | Jeckeln et al. | 375/296 |
| 7,596,363 B2 * | 9/2009 | Mo et al. | 455/323 |
| 7,920,462 B2 * | 4/2011 | Muschallik et al. | 370/210 |

OTHER PUBLICATIONS

Mikhemar, Mohyee, Interference Cancellation in Software-Defined CMOS Receivers, PhD dissertation, University of California, Los Angeles, CA, Apr. 27, 2010, 95 pp.
Aparin, Vladimir, Ballantyne, Gary J., Persico, Charles J., and Cicalini, Alberto, An Integrated LMS Adaptive Filter of TX Leakage for CDMA Receiver Front Ends, IEEE Journal of Solid-State Circuits, May 2006, pp. 1171-1182, vol. 41, No. 5.
Keehr, Edward A. And Hajimiri, Ali, Equalization of Third-Order Intermodulation Products in Wideband Direct Conversion Receivers, IEEE Journal of Solid-State Circuits, Dec. 2008, pp. 2853-2867, vol. 43, No. 12.
Lou, Shuzuo and Luong, Howard C. A Linearization Technique for RF Receiver Front-End Using Second-Order-Intermodulation Injection, IEEE Journal of Solid-State Circuits, Nov. 2008, pp. 2404-2412, vol. 43, No. 11.
Valkama,Mikko, Renfors, Markku, and Koivunen, Visa, Advanced Methods for I/Q Imbalance Compensation in Communication Receivers, IEEE Transactions on Signal Processing, Oct. 2001, pp. 2335-2344, vol. 49, No. 10.

* cited by examiner

*Primary Examiner* — Khanh C Tran
(74) *Attorney, Agent, or Firm* — Garlick & Markison

(57) ABSTRACT

A technique to remove second order and third order nonlinearity distortions caused by a blocker signal at an input of a radio receiver. An envelope detector is utilized at an input of the RF front-end of the receiver to obtain a magnitude of the overall signal. The output of the envelope detector is then processed at baseband to estimate coefficients that relate to the distortion. Once the coefficients are obtained, the coefficients are applied at an I/Q imbalance correction stage to also correct for the distortion by cancelling the distortion from the received signal.

20 Claims, 7 Drawing Sheets

DISTORTION CANCELLATION IN RADIO RECEIVERS USING I/Q CORRECTION

CROSS REFERENCE TO RELATED APPLICATION

This patent application is claiming priority under 35 U.S.C. §119(e) to a provisionally filed patent application entitled, "Distortion cancellation using I/Q correction," having a provisional filing date of Jul. 26, 2010, and a provisional serial number of 61/367,825, which is incorporated herein by reference in its entirety and made part of the present U.S. Utility Patent Application for all purposes.

BACKGROUND OF THE INVENTION

1. Technical Field of the Invention

The embodiments of the invention relate to communication devices and more particularly to distortion cancellation in a radio receiver.

2. Description of Related Art

Various wireless communication systems are known today to provide links between devices, whether directly or through a network. Such communication systems range from national and/or international cellular telephone systems, the Internet, point-to-point in-home system, as well as other systems. Communication systems typically operate in accordance with one or more communication standards or protocol. For instance, wireless communication systems may operate using protocols, such as IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), as well as others.

For each wireless communication device to participate in wireless communications, it generally includes a built-in radio transceiver (i.e., receiver and transmitter) or is coupled to an associated radio transceiver (e.g., a station for in-home and/or in-building wireless communication networks, modem, etc.). Typically, the transceiver includes a baseband processing stage and a radio frequency (RF) stage. The baseband processing provides the conversion from data to baseband signals for transmitting and baseband signals to data for receiving, in accordance with a particular wireless communication protocol. The baseband processing stage is coupled to a RF stage (transmitter section and receiver section) that provides the conversion between the baseband signals and RF signals. The RF stage may be a direct conversion transceiver that converts directly between baseband and RF or may include one or more intermediate frequency stages.

Furthermore, wireless devices typically operate within certain radio frequency ranges or band established by one or more communications standards or protocols. A local oscillator generally provides a local oscillation signal that is used to mix with received RF signals or baseband signals that are to be converted to RF signals in the modulation/demodulation stage of the RF front end. A synthesizer may be used to set the frequencies to drive the local oscillator to provide the desired frequencies for mixing, in which the desired frequencies are generally based on the channel frequencies established for the particular standard or protocol.

In a typical RF receiver, a basic functionality is for the receiver to convert a received signal on a specific channel, having a designated carrier frequency and bandwidth, into a baseband signal, having a stream of baseband samples that resembles the complex baseband representation of the signal transmitted on the specific channel. The data is then recovered from the baseband signal. In operation, the bandwidth limiting properties of the receiver is capable of attenuating or removing many of the unwanted signals. However, some unwanted signals are within the receiving bandwidth of the receiver and are coupled via the antenna to the receiver front end. In some instances, these unwanted signals are due to the transmitted signal having the same or close carrier frequency to the received signal. In some instances, the unwanted signals may be from nearby channels (e.g. adjacent channels). In some instances, the unwanted signals may be the result of interfering signals occurring with the allowed bandwidth. In other instances, the interference may be from noise. It may also be from other sources or a combination of these sources. Any strong unwanted signal that is coupled through to the receiver front end is referred to as a "blocker" or "blockers."

In an ideal receiver, which would be perfectly linear in its response characteristics, only the wanted (desired) signal will be coupled through and all unwanted signals would be rejected. However, in practical applications, ideal receivers are difficult or impossible to achieve. Hence, because of the non-linear response characteristics of the receiver, a blocker signal may interact with the desired signal. In some instances, the blocker signal may mix with local signals, such as the local oscillator signal, to inject interfering or inter-modulation signal(s) on top of the desired signal. Those interfering signals that are outside of the specified bandwidth may be attenuated, but others may be present within the bandwidth to interfere or interact with the desired signal. One technique of dealing with these blockers is to provide complex filters to remove or cancel the blockers. Still, other techniques may utilize more complex cancellation techniques. However, utilizing complex filters may require specialized filtering circuitry (sometimes located off chip). These and other cancellation techniques are generally frequency dependent, which makes it difficult to obtain the cancellation estimates, because the blockers may shift in frequency/phase. Further, these complex methods may add significant cost to the design and/or manufacture of the receiver.

Accordingly, there is a need to obtain a more desirable way to cancel the effects of a blocker signal that is more independent of frequency in estimating the cancellation values.

SUMMARY OF THE INVENTION

The present invention is directed to apparatus and methods of operation that are further described in the following Brief Description of the Drawings, the Detailed Description of the Invention, and the Claims. Other features and advantages of the present invention will become apparent from the following detailed description of the embodiments of the invention made with reference to the accompanying drawings.

DETAILED DESCRIPTION OF THE INVENTION

The embodiments of the present invention may be practiced in a variety of radio receivers to cancel distortion caused by blocker signal(s) that are coupled through an antenna of the receiver. The particular embodiment described below applies the distortion cancellation in an I/Q correction stage within the digital domain of the receiver, however, other embodiments may implement the distortion cancellation at other stages. Furthermore, the formulations provided herein describe just one technique to obtain estimates for the distortion and to apply cancellation values based on those estimates to remove the distortion. In other embodiments, other formulations may be readily employed for equivalent ways of cancelling the distortion.

Figure 1:
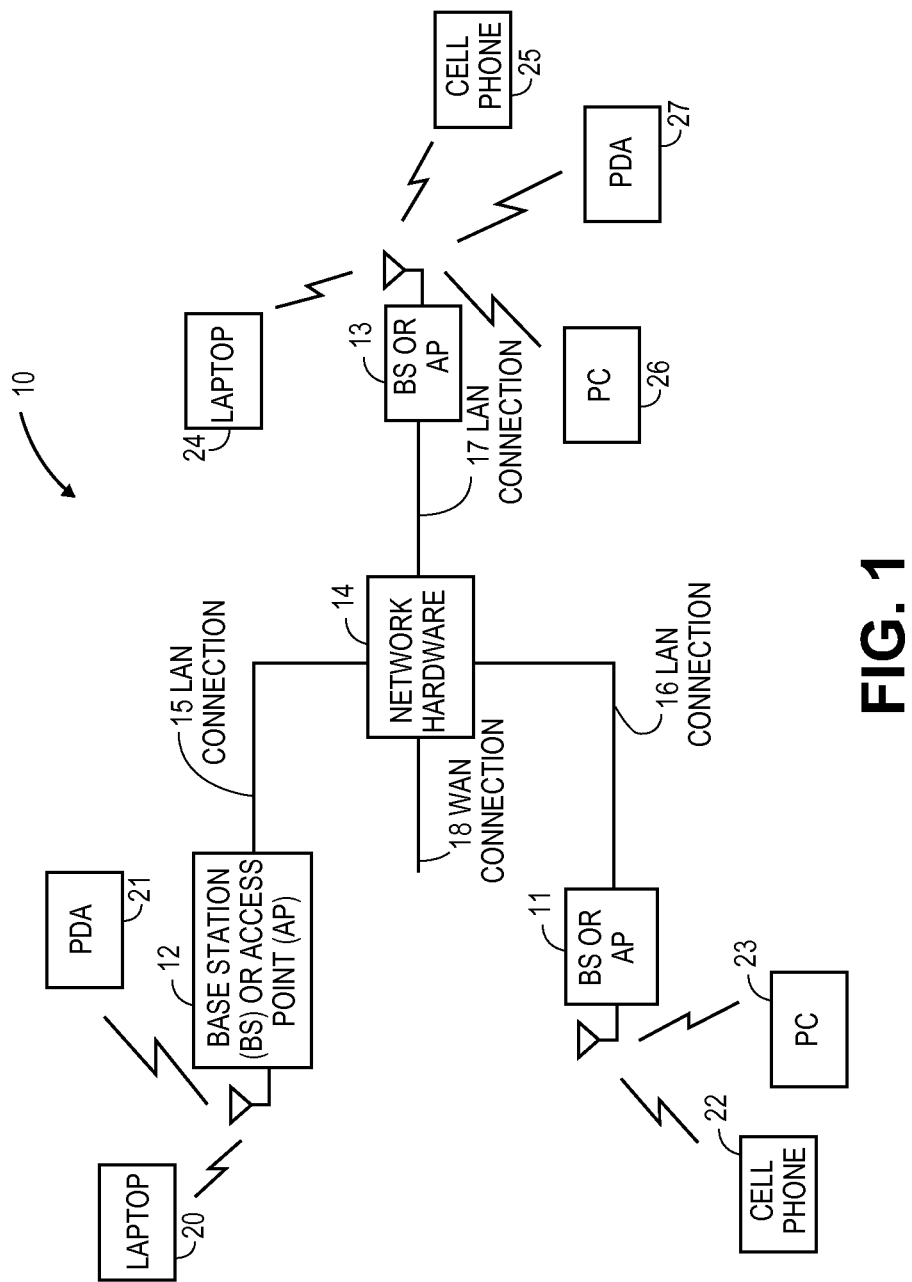
FIG. 1 is a block diagram showing a wireless communication system in accordance with one embodiment for practicing the present invention.

FIG. 1 illustrates one environment for practicing the present invention. FIG. 1 shows a communication system 10 that includes a plurality of base stations (BS) and/or access points (AP) 11-13, a plurality of wireless communication devices 20-27 and a network hardware component 14. The wireless communication devices 20-27 may be laptop computers 20 and 24, personal digital assistants 21 and 27, personal computers 23 and 26, cellular telephones 22 and 25, and/or any other type of device that supports wireless communications.

The base stations or access points 11-13 may be operably coupled to network hardware 14 via respective local area network (LAN) connections 15-17. Network hardware 14, which may be a router, switch, bridge, modem, system controller, etc., may provide a wide area network (WAN) connection 18 for communication system 10. Individual base station or access point 11-13 generally has an associated antenna or antenna array to communicate with the wireless communication devices in its area. Typically, the wireless communication devices register with a particular base station or access point 11-13 to receive services within communication system 10. For direct connections (i.e., point-to-point communications), wireless communication devices may communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio. The radio includes a highly linear amplifiers and/or programmable multi-stage amplifiers to enhance performance, reduce costs, reduce size, and/or enhance broadband applications.

Figure 2:
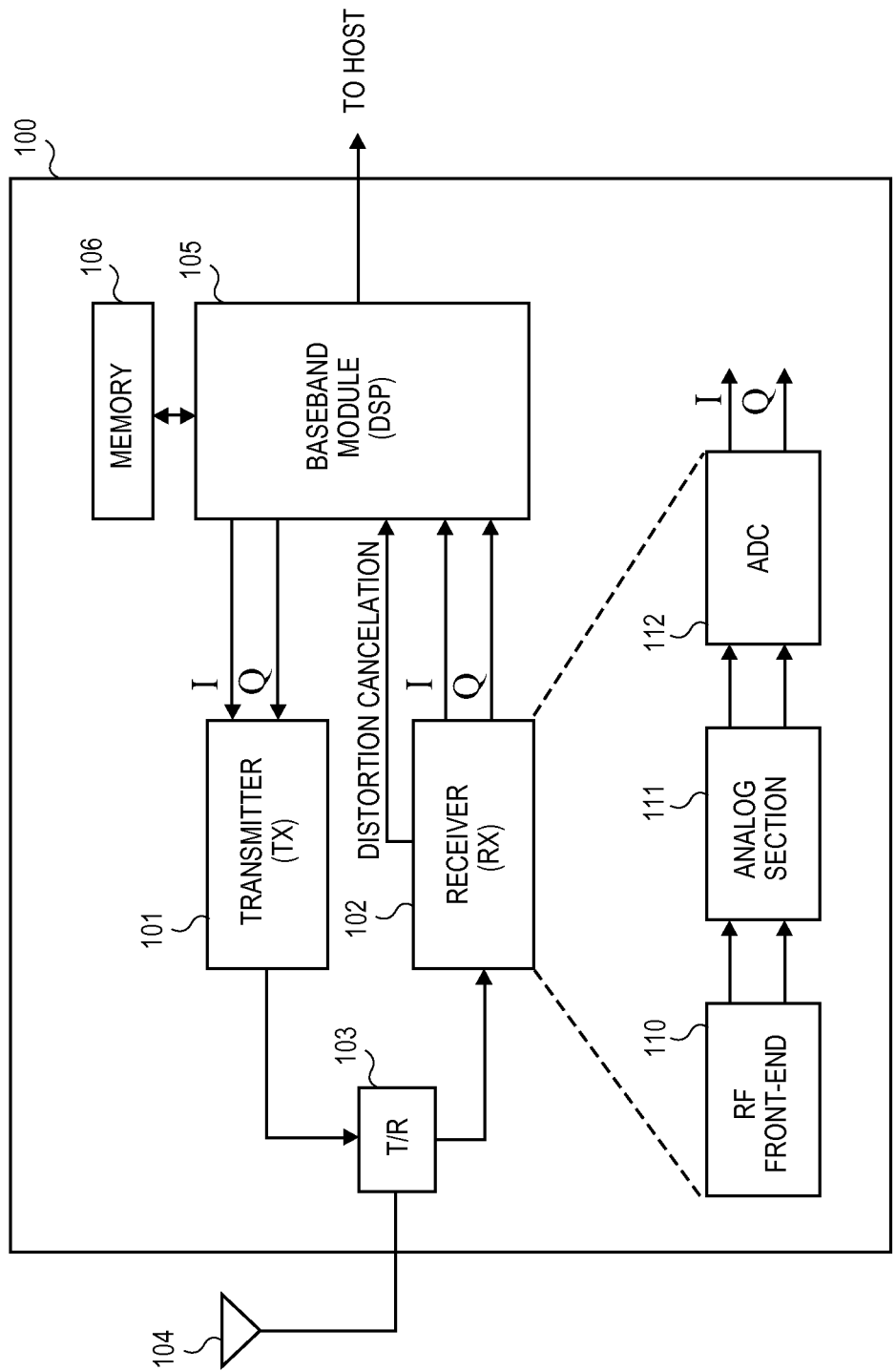
FIG. 2 is a schematic block diagram showing an embodiment of a wireless communication device for practicing the present invention.

FIG. 2 is a schematic block diagram illustrating part of a wireless communication device 100 that includes a transmitter (TX) 101, receiver (RX) 102 and baseband module 105. In some embodiments, baseband module 105 is or includes a digital-signal-processor (DSP). Baseband module 105 is typically coupled to a host unit, applications processor or other unit(s) that provides operational processing for the device and/or interface with a user. Device 100 may be incorporated in one or more of the wireless communication devices 20-27 shown in FIG. 1. A memory 106 is shown coupled to baseband module 105, which memory 106 may be utilized to store data, as well as program instructions that operate on baseband module 105. Various types of memory devices may be utilized for memory 106. It is to be noted that memory 106 may located anywhere within device 100 and, in one instance, it may also be part of baseband module 105.

Transmitter 101 and receiver 102 are coupled to an antenna 104 via transmit/receive (T/R) switch module 103. T/R switch module 103 switches between the transmitter and receiver to permit full duplex operations. It is to be noted that in other embodiments, separate antennas may be used for transmitter 101 and receiver 102, respectively.

Outbound data for transmission from device 100 are coupled to baseband module 105 and converted to baseband in-phase (I) and quadrature (Q) signals and coupled to transmitter 101. Transmitter 101 then converts the baseband I/Q signals to outbound radio frequency (RF) signals for transmission from device 100 via antenna 104. Transmitter 101 may utilize one of a variety of up-conversion or modulation techniques to convert the outbound baseband I/Q signals to outbound RF signal. Generally, the conversion process is dependent on the particular communication standard or protocol being utilized.

In a similar manner, inbound RF signals are received by antenna 104 and coupled to receiver 102. Receiver 102 then converts the inbound RF signals to inbound baseband I and Q signals, which are then coupled to baseband module 105. Receiver 102 may utilize one of a variety of down-conversion or demodulation techniques to convert the inbound RF signals to inbound baseband I/Q signals. The inbound baseband I/Q signals are processed by baseband module 105 and inbound data is output from baseband module 105 to the host unit, application processor, etc., that is coupled to baseband module 105.

It is to be noted that in one embodiment, baseband module 105, transmitter 101 and receiver 102 are integrated on the same integrated circuit (IC) chip. In other embodiments, one or more of these components may be on separate IC chips. Similarly, other components shown in FIG. 2 may be incorporated on the same IC chip, along with baseband module 105, transmitter 101 and receiver 102. In some embodiments, the antenna may also be incorporated on the same IC chip as well. Furthermore, with advent of system-on-chip (SOC) integration, host devices, application processors and/or user interfaces, may be integrated on the same IC chip along with baseband module 105, transmitter 101 and receiver 102.

Additionally, although one transmitter 101 and receiver 102 are shown, it is to be noted that other embodiments may utilize multiple transmitter units and receiver units. For example, diversity communication and/or multiple input and/or multiple output communications, such as multiple-input-multiple-output (MIMO) communication, may utilize multiple transmitters 101 and/or receivers 102 within device 100.

FIG. 2 further illustrates a breakdown of receiver 102, since the described embodiments of the invention are practiced in the receiving branch of device 100. Receiver 102 is generally comprised of a RF front-end 110, analog section 111 and analog-to-digital conversion (ADC) stage 112. The received RF signal from antenna 104 is coupled to RF front-end 110, via T/R switch module 103. RF front-end 110 utilizes a down-conversion, detection and/or demodulation technique(s) to convert the RF signal to an analog baseband signal. The example of FIG. 2 shows a direct conversion process, but other embodiments may readily utilize indirect conversion where there may be one or more intermediate frequency (IF) stages. The output from RF front-end 110 is typically an analog I signal and an analog Q signal.

The analog I/Q signals are coupled to an analog section 111 for processing. Typically, analog section 111 is comprised of a filter or filters (or other equivalent components) to provide filtering, attenuation and/or band pass functions. A low-pass filter (LPF) is typically utilized to pass signals at a lower frequency range (e.g. low-frequency band or low-pass band) near a DC level. The filtered output from analog section 111 are coupled to ADC stage 112 for conversion from an analog format to a digital format, wherein sampled I/Q signals from ADC stage 112 are then coupled as inbound digital baseband I/Q signals for digital processing by baseband module 105.

Also shown in FIG. 2 is a distortion cancellation signal that is coupled from receiver 102 to baseband module 105. As will be described below, this distortion cancellation signal that is obtained in the analog domain is subsequently used in the digital domain of baseband module 105 to generate cancellation values to remove (cancel) the distortion caused by a blocker signal received at antenna 104.

Figure 3:
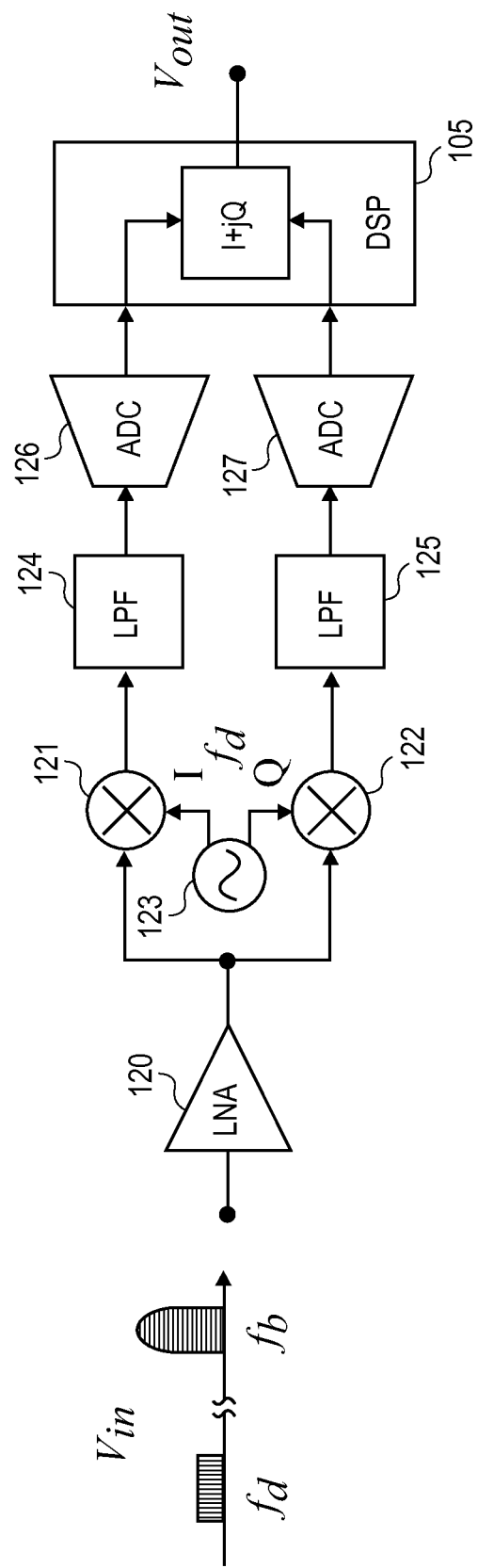
FIG. 3 is a block schematic diagram showing a radio receiver and presence of a desired signal and a blocker signal at a receiver front end.

FIG. 3 shows a more detailed functional block diagram of receiver 102 according to one embodiment of the invention. The circuit shown in FIG. 3 includes a low noise amplifier (LNA) 120, down-converter mixers 121 and 122 and receiver local oscillator 123, which are part of RF front end 110. Low pass filters (LPFs) 124 and 125 are part of analog section 111. ADCs 126 and 127 are part of ADC stage 112. In operation, LNA 120 gain adjusts the received RF signal from antenna 104 and provides the LNA output to mixers 121, 122. Local oscillator 123 provides an in-phase local oscillation signal and quadrature local oscillation signal to respective mixers 121, 122. The two local oscillation signals are typically 90 degrees apart in phase. Accordingly, the upper branch involving mixer 121 provides the in-phase (I) branch, while the lower branch provides the quadrature (Q) branch of receiver 102. The down-converted outputs from mixers 121, 122 are then filtered by LPFs 124, 125 and converted to digital baseband signals by ADC 126, 127. The digital baseband signals are then coupled to baseband module 105 where the baseband I and Q signals are combined and processed by baseband module 105, noted as I+jQ. The combined I+jQ output from baseband module 105 is shown as Vout.

Also shown in FIG. 3 is an input signal Vin. Signal Vin represents the signal coupled through antenna 104 to the input of LNA 120. Signal Vin is shown having two signal components. One component represents a desired (wanted) signal component having a center frequency $f_d$, while the second component represents an interference (or blocker) signal component having a center frequency $f_b$. There may be other blocker signal components in actual practice, but only one is shown to simplify the explanation below. Receivers may experience one dominant blocker signal that passes through to the receiver or multiple blockers that pass to the receiver. The amplitudes of the two signals are shown, in which the blocker signal is shown larger in magnitude. It is to be noted that the blocker signal may be of equal amplitude or lesser amplitude than the desired signal component. However, for purposes of this discussion, the blocker signal is assumed to be larger in magnitude than the desired signal to indicate the substantial interference (or distortion) that a blocker may present to the desired signal when the blocker is present at the input of the receiver and subsequently amplified.

The input signal Vin may be represented by equation (1):

$$V_{in}(t)=A_d(t)\cos(\omega_d t+\theta_d(t))+A_b(t)\cos(\omega_b t+\theta_b(t)) \quad (1)$$

where the first term represents the desired signal component and the second term represents the blocker component. $A_d$ represents the amplitude of the desired signal component and the cosine term represents the frequency and phase modulation Likewise, $A_b$ represents the amplitude of the block and the cosine term represents the frequency and phase modulation of the blocker.

It is to be appreciated that distortion cancellation techniques generally involve two steps. The first step is to estimate the distortion signal utilizing some technique. The second step is to utilize the estimation to apply a cancellation technique to cancel the distortion. That is, once the distortion is estimated, the estimation values are applied to subtract the distortion from the received signal. The estimation of the distortion requires either the knowledge of the nature of the distortion or knowledge of the blocker itself. In either instance, determining or reproducing the distortion information is not an easy task, since blocker signals are typically not stationary. For example, strength of the various blockers may vary, so that it is difficult to determine which blocker signal is the strongest at any given time. Further, blockers may shift in frequency/phase, making it difficult to obtain estimations if the estimation technique needs to account for such frequency/phase shifts.

As will be described below, the embodiments of the invention address distortion cancellation by utilizing estimation of the distortion that relies on the amplitude (magnitude) of the blocker signal and not on the phase component of the blocker. Stated alternatively, if a distortion estimation technique is based on the amplitude of the blocker, and not on the frequency/phase of the blocker, then estimation of the blocker signal may be obtained by simply observing the strength of the blocker signal and no determination need be made of the frequency of the blocker signal. Thus, a cancellation technique that is based on the amplitude of the blocker, need not be concerned if the blocker shifts in frequency.

Furthermore, it is to be appreciated that pure analog/RF cancellation schemes are typically limited by the accuracy of the cancellation coefficients. On the other hand, pure digital cancellation schemes are based on blind estimation of the distortion and, hence, may require long training time to obtain the estimation. The embodiments of the invention described below utilize a mixed-signal technique that obtains information about the blocker from the analog domain and calculates the cancellation coefficients in the digital domain. The mixed-signal technique benefits from advantages that are obtained in both domains. Namely, signal detection in the analog domain and using the detection to obtain estimates of the cancellation coefficients in the digital domain.

When using equation (1) to represent the combined (desired and blocker) inbound signal, the output signal of baseband processing may be represented by equation (2):

$$\tilde{V}_{out} = \frac{k_1}{2}A_d(t)e^{-j\theta_d(t)} + \frac{(k_{2I}+jk_{2Q})}{2}A_b^2(t) + \frac{3k_3}{4}A_b^2(t)A_d(t)e^{-j\theta_d(t)} \quad (2)$$

Figure 4:
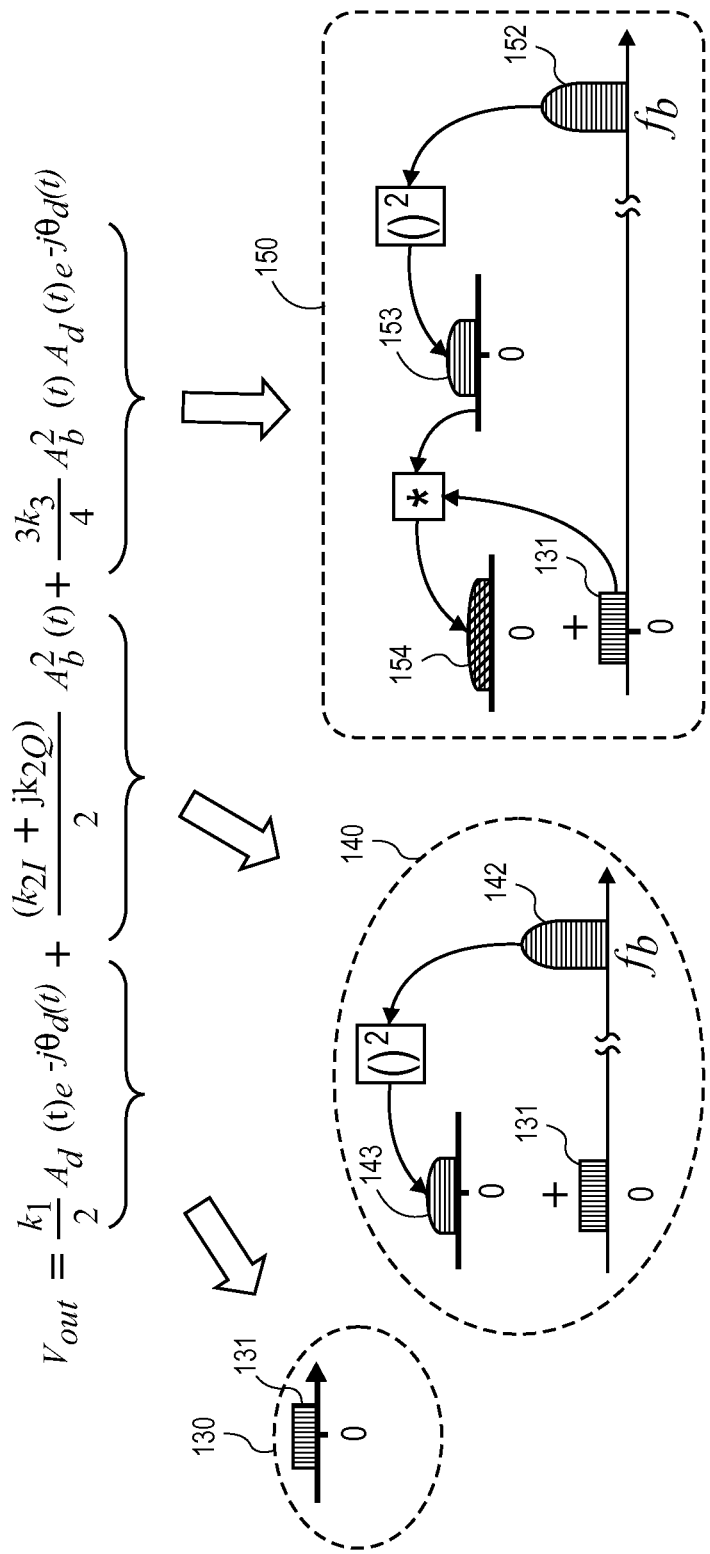
FIG. 4 illustrates distortion effects from a blocker signal when operated by non-linear response characteristics of a receiver.

Equation (2) is comprised of three terms separated by the "+" sign. FIG. 4 also shows equation (2) and illustrates the three terms of the equation as they relate to the input signal.

The first term represents a gain adjusted (scaled) version of the desired signal, as shown by desired receiver signal output 131 in dashed area 130. The second term represents amplitude modulation (AM)-detection distortion caused by the blocker, as shown in dashed area 140. The third term represents cross-modulation distortion caused by the blocker, as shown in dashed area 150.

When characterizing the output by equation (2), the first term represents the desired signal, scaled by the receiver gain. The first term is equivalent to receiver output 131, which is shown as a low-frequency (or low-pass) band near DC after down-conversion. The second term represents the AM-detection distortion. A blocker 142 at any frequency passing through second order nonlinearity may create distortion approximately at or near the low-pass band. Because the desired receiver output 131 is also around DC in the low-pass band, the AM-detection distortion lies atop the desired output 131 and adds to the output 131. In FIG. 4, second order nonlinearity, shown as ( )$^2$, operates on blocker 142 to cause a AM-detected distortion 143, which adds (+) to output 131.

The third term represents the third order nonlinearity, which is a product of two terms. The first is the second-order distortion of blocker 152, resulting in the distortion 153 approximately at or near the low-pass band. The resulting distortion 153 may be the same as distortion 143. However, with the third order nonlinearity, this distortion 153 then mixes (shown as *) with output 131 to generate inter-modulation distortion 154 about the low-pass band, which adds to output 131. Thus, both the second order and third order distortions eventually reside atop the desired receiver output 131 and these distortion components are additive to the desired signal 131.

It is evident from equation (2) that both the second order and third order distortions may be represented by components that reside near DC in the low-frequency (low-pass) band, thereby allowing distortion estimations to be made that are strictly independent of frequency. Accordingly, by performing the calculations based on equation (2), distortion estimation may be obtained by strictly observing the amplitude of the received signal approximately at or near DC in the low-pass band, without the need to determine carrier frequency of the blocker.

Figure 5:
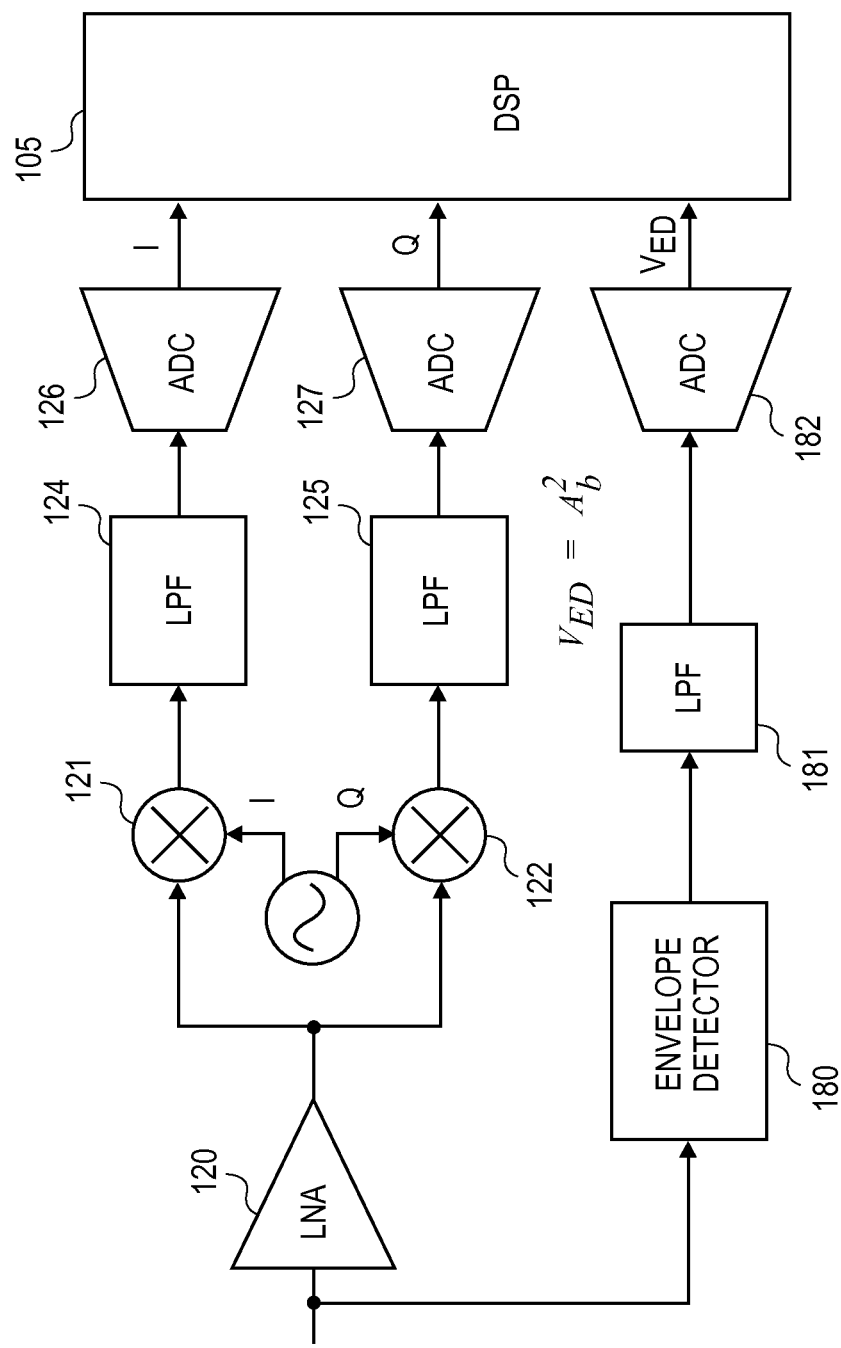
FIG. 5 is a block schematic diagram showing a use of an envelope detector to provide a cancellation signal in the analog domain of a receiver to cancel the distortion caused by the blocker signal in the digital domain.

FIG. 5 shows one embodiment of the invention to obtain a distortion cancellation signal in the receiver. Various components of the receiver that were shown in FIG. 3 are duplicated in FIG. 5. However, receiver 102 now includes a third branch comprised of envelope detector 180, LPF 181 and ADC 182. The received signal at the input of LNA 120 is coupled as input of envelope detector 180. In other embodiments, scaled output of LNA 120 may be coupled as the input to envelope detector 180. The output of ADC 182 is denoted as $V_{ED}$ and coupled to baseband module 105. In one particular embodiment, envelope detector 180 is a non-coherent AM-detector. In other embodiments, other types of envelope detectors may be employed. Still in other embodiments, some other amplitude detecting circuitry (other than an envelope detector) may be used for amplitude detection. It is to be noted that amplitude detection by envelope detector 180 is cumulative, so that it can detect distortion by multiple blockers at different frequencies. Furthermore, the amplitude detection provided by envelope detector 180 resides in the analog domain and the distortion cancellation signal $V_{ED}$ provided to baseband module 105 is digital.

With the particular embodiment utilizing envelope detector 180, the envelope detector is a circuit with strong second-order linearity. Thus, the input-output characteristics of envelope detector 180 is given by Vout(t) equal to or proportional ($\alpha$) to $A_b^2(t)$. For the input defined in equation (1), and given that the blocker is stronger than the desired signal, the $V_{ED}$ output has the relationship of $V_{ED}(t) \propto A_b^2(t)$.

The $V_{ED}(t)$ value represents the distortion caused by one or more blockers, since it is related to the amplitude squared value of the distortion components. The $V_{ED}(t)$ value is then sent to baseband module 105 as the distortion cancellation signal and the calculations to obtain the cancellation coefficients to substantially remove the distortion may now be performed in the digital domain by baseband processor 105.

In performing the distortion cancellation calculations, equation (2) may be rewritten as:

$$\tilde{V}_{out} = \varepsilon \tilde{V}_d(1 + \mu A_b^2(t)) + \delta A_b^2(t) \qquad (3)$$

where $$\tilde{V}_d = A_d(t)e^{-j\theta_d(t)}, \varepsilon = \frac{k_1}{2}, \mu = \frac{3k_3}{2k_1}, \delta = \frac{(k_{2I} + jk_{2Q})}{2}$$

Note that Vout is the combined I+jQ output to baseband module 105, as noted in FIG. 3.

Figure 6:
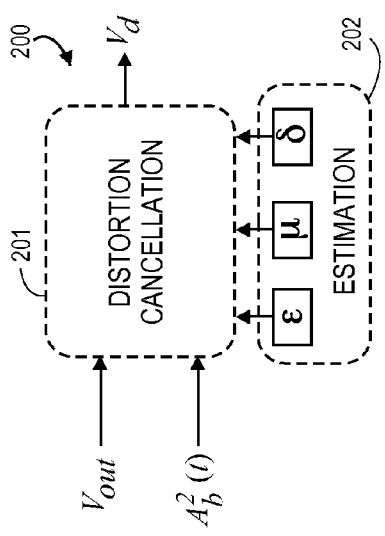
FIG. 6 is a block schematic diagram showing an implementation of a distortion cancellation module in the digital domain to cancel distortion caused by the blocker signal.

Accordingly, FIG. 6 illustrates a stage 200 to correct for the distortion caused by the second order and third order nonlinearity response in a receiver to a blocker signal. From equation (3), since $A_b^2(t)$ is known from $V_{ED}$, it is evident that once the values of the three coefficient values of $\varepsilon$, $\mu$ and $\delta$ are known, appropriate steps may be taken to cancel the distortion in the output signal. Distortion cancellation module 201 in baseband module 105 receives Vout, $A_b^2(t)$ and coefficients $\varepsilon$, $\mu$ and $\delta$ and subtracts the estimated distortion from Vout. Once the distortions are canceled, the remaining signal is the substantially distortion free signal Vd.

As shown in FIG. 6, the coefficient values $\varepsilon$, $\mu$ and $\delta$ are obtained from estimation module 202. A number of techniques may be utilized to obtain the coefficients $\varepsilon$, $\mu$ and $\delta$. However, one technique is to utilize training symbols in the received signal to obtain the coefficients. Training symbols are known values in a transmitted signal that allow the receiver to apply these known values and perform certain tasks to obtain signal or channel characteristics. For example, training symbols are utilized to obtain equalization coefficients in a receiver. Accordingly, applicable training symbols in a received signal may be utilized to provide known values that are operated on by the nonlinear response characteristics of the receiver to obtain estimations of coefficients $\varepsilon$, $\mu$ and $\delta$ in estimation module 202. It is to be noted that either or both modules 201, 202 may be implemented in hardware, software or combination of both. In the particular embodiment described herein, software algorithms operating with the DSP of baseband module 105 perform the necessary operations to obtain the coefficients $\varepsilon$, $\mu$ and $\delta$, utilizing the training symbols.

Although the cancellation correction may be performed at various stages of processing the inbound baseband signal in baseband module 105, in one embodiment, the cancellation operation is performed in conjunction with I and Q correction.

Figure 7:
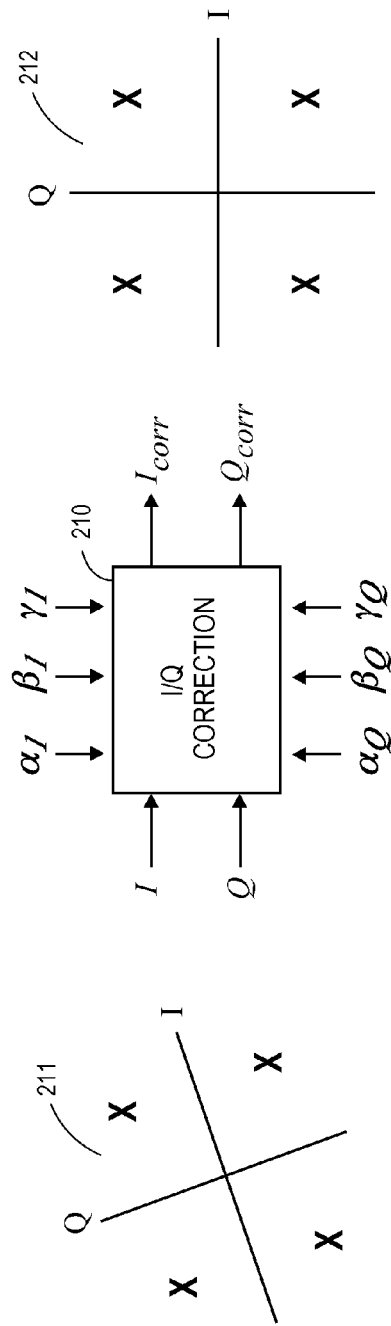
FIG. 7 illustrates an I/Q correction that is implemented in the digital domain to correct for I and Q imbalance.

FIG. 7 illustrates a traditional I/Q correction performed at the baseband stage of a receiver. As shown, an I/Q correction module 210 (which may be hardware, software, or a combination of both) is utilized to correct for I and/or Q imbalance. I/Q correction operations attempt to obtain proper relationship of the in-phase and quadrature components of angle modulated signals. As graphically illustrated in FIG. 7, a constellation 211 is rotated to proper orientation 212 by I/Q correction module 210 when corrected for I/Q imbalance. Coefficients $\alpha_I$, $\beta_I$ and $\gamma_I$ are utilized to correct the in-phase component of the received signal and coefficients $\alpha_Q$, $\beta_Q$ and $\gamma_Q$ are utilized to correct the quadrature component of the received signal. Generally, coefficients $\alpha_I$, $\beta_I$, $\gamma_I$, $\alpha_Q$, $\beta_Q$ and $\gamma_Q$ are obtained utilizing least-mean-square (LMS) techniques. A variety of I/Q imbalance correction techniques are known for use in baseband processing. Equations (4) illustrate the operation of I/Q correction module 210.

$$I_{corr} = \alpha_I I + \beta_I Q + \gamma_I$$

$$Q_{corr} = \alpha_Q I + \beta_Q Q + \gamma_Q \quad (4)$$

Figure 8:
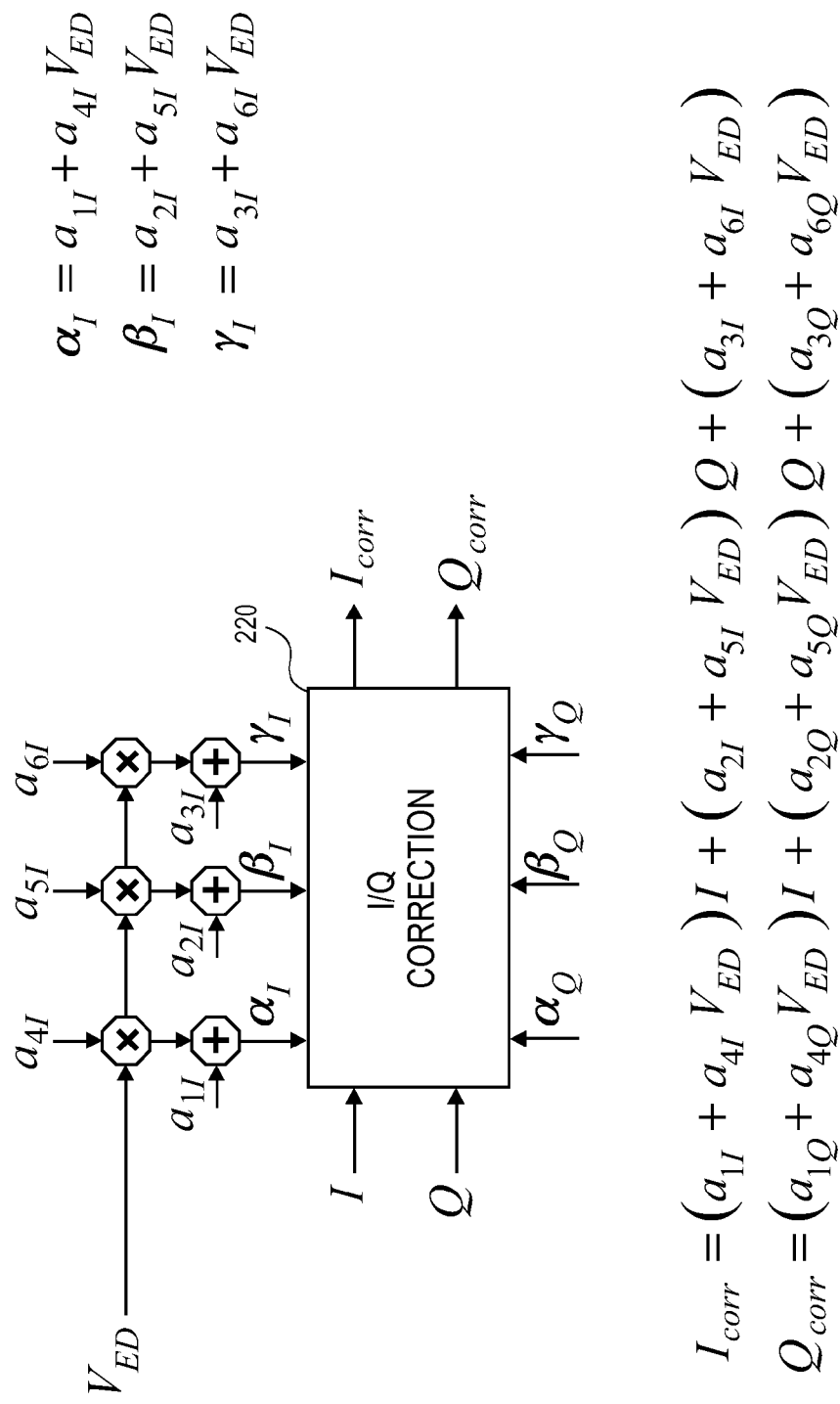
FIG. 8 is block schematic diagram showing the implementation of the distortion cancellation module of FIG. 6 as part of I/Q correction of FIG. 7 to provide the distortion cancellation in the I/Q correction stage.

In one embodiment for practicing the invention, the distortion cancellation technique as described above is combined within the I/Q imbalance correction stage as described in reference to FIG. 7. Accordingly, as shown in FIG. 8, I/Q correction module 220 is utilized to provide both I/Q correction and distortion cancellation. In this technique, coefficients $\alpha_I$, $\beta_I$ and $\gamma_I$ are determined by equations (5):

$$\alpha_I = a_{1I} + a_{4I} V_{ED}$$

$$\beta_I = a_{2I} + a_{5I} V_{ED}$$

$$\gamma_I = a_{3I} + a_{6I} V_{ED} \quad (5)$$

where $a_{1I}$, $a_{2I}$ and $a_{3I}$ are utilized for I correction and coefficients $a_{4I}$, $a_{5I}$ and $a_{6I}$ correspond to the earlier described coefficients $\epsilon$, $\mu$ and $\delta$. As shown in FIG. 8, the coefficients $a_{4I}$, $a_{5I}$ and $a_{6I}$ with $V_{ED}$ and subsequently combine with $a_{1I}$, $a_{2I}$ and $a_{3I}$. Estimation of the I/Q and distortion cancellation coefficients may be written in equation form as:

$$I_{corr} = (a_{1I} + a_{4I}V_{ED})I + (a_{2I} + a_{5I}V_{ED})Q + (a_{3I} + a_{6I}V_{ED})$$

$$Q_{corr} = (a_{1Q} + a_{4Q}V_{ED})I + (a_{2Q} + a_{5Q}V_{ED})Q + (a_{3Q} + a_{6Q}V_{ED}) \quad (6)$$

and in matrix format as:

$$\begin{bmatrix} I_{corr} \\ Q_{corr} \end{bmatrix} = \begin{bmatrix} a_{1I} & a_{4I} & a_{2I} & a_{5I} & a_{3I} & a_{6I} \\ a_{1Q} & a_{4Q} & a_{2Q} & a_{5Q} & a_{3Q} & a_{6Q} \end{bmatrix} \cdot \begin{bmatrix} I \\ I \cdot V_{ED} \\ Q \\ Q \cdot V_{ED} \\ 1 \\ V_{ED} \end{bmatrix} \quad (7)$$

which may be further written in the form:

$$Y = aX \quad (8)$$

where:

$$Y = \begin{bmatrix} I_{corr} \\ Q_{corr} \end{bmatrix} \quad (9)$$

$$a = \begin{bmatrix} a_{1I} & a_{4I} & a_{2I} & a_{5I} & a_{3I} & a_{6I} \\ a_{1Q} & a_{4Q} & a_{2Q} & a_{5Q} & a_{3Q} & a_{6Q} \end{bmatrix}$$

$$X = \begin{bmatrix} I \\ I \cdot V_{ED} \\ Q \\ Q \cdot V_{ED} \\ 1 \\ V_{ED} \end{bmatrix}$$

First the value of "a" is calculated in training mode using training symbols. Then, the values are used to calculate the corrected values from Y from the received values of X. In training mode, a training sequence Yt is sent, then the value of "a" is calculated from the received signal Xt using a technique, such as LMS to obtain the solution.

$$a = Y_t X_t^{-1} \quad (10)$$

In the normal mode of operation, the calculated value of "a" is used along with the received data X to calculate the corrected value Y as noted in equation (8).

Thus, a distortion cancellation technique for a radio receiver is described. In one embodiment, the correction is applied at the I/Q imbalance correction stage, however, in other embodiments, the correction may be applied at other stages of baseband processing the received signal. The distortion cancellation is substantially independent of the frequency of the blocker signal, thereby making the correction simpler to implement. With some embodiments that implement the invention, certain advantages may be derived (although these advantages are not necessary for practicing the invention). For example, simpler or less costly components may be used to improve the effective linearity of the receiver, which may also save space on integrated circuit and/or save on power consumption. Improved effective linearity may relax requirements on RF filtering, so that less signal filtering is needed. Other advantages abound in improving the effective linearity of the receiver.

As may be used herein, the terms "substantially" and "approximately" provides an industry-accepted tolerance for its corresponding term and/or relativity between items. Such an industry-accepted tolerance ranges from less than one percent to fifty percent. Such relativity between items ranges from a difference of a few percent to magnitude differences. As may also be used herein, the term(s) "coupled" and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items.

The embodiments of the present invention have been described above with the aid of functional building blocks illustrating the performance of certain functions. The boundaries of these functional building blocks have been arbitrarily defined for convenience of description. Alternate boundaries could be defined as long as the certain functions are appropriately performed. One of ordinary skill in the art may also recognize that the functional building blocks, and other illustrative blocks, modules and components herein, may be implemented as illustrated or by discrete components, application specific integrated circuits, processors executing appropriate software and the like or any combination thereof.

We claim:

1. An apparatus comprising:
   an analog front-end of a wireless radio receiver coupled to receive an inbound signal, down-convert the inbound signal and generate an in-phase (I) component and a quadrature (Q) component of a down-converted signal as baseband I and Q outputs;
   an amplitude modulation detector coupled to receive the inbound signal and to detect a modulated amplitude of the inbound signal that includes both a desired signal and a distortion signal, the amplitude modulation detector providing an output that is indicative of the modulated amplitude of the inbound signal; and a baseband module coupled to receive the baseband I and Q outputs and the output from the amplitude modulation module, to process the output from the amplitude modulation module to estimate second order nonlinearity and third order nonlinearity distortions caused by nonlinear characteristics of the radio receiver in receiving both the desired signal and the distortion signal in the inbound signal, generate first coefficients to cancel the second order nonlinearity and third order nonlinearity distortions and apply the first coefficients with second coefficients that are used to cancel I/Q imbalance at an I/Q imbalance correction stage to substantially cancel the second order nonlinearity and third order nonlinearity distortions when baseband processing the baseband I and Q outputs in the baseband module.

2. The apparatus of claim 1, wherein the first coefficients to cancel second order nonlinearity and third order nonlinearity distortions are combined with in-phase imbalance coefficients of the second coefficients at the I/Q imbalance correction stage.

3. The apparatus of claim 1, wherein the desired signal is at a low-frequency level after down-conversion and the second order nonlinearity is determined as a low-frequency signal component of the distortion signal after down-conversion.

4. The apparatus of claim 3, wherein the third order nonlinearity is determined as a low-frequency component that results from inter-modulation of the desired signal with a low-frequency signal component of the distortion signal after down-conversion.

5. The apparatus of claim 1, wherein training symbols are utilized to generate the first coefficients to cancel the second order nonlinearity and third order nonlinearity distortions.

6. The apparatus of claim 1, wherein three coefficients, defined as $\epsilon$, $\mu$ and $\delta$, are generated as first coefficients to cancel the second order nonlinearity and third order nonlinearity distortions.

7. The apparatus of claim 1, wherein when estimating the second order nonlinearity and third order nonlinearity distortions, estimates of the second order nonlinearity and third order nonlinearity distortions are independent of a frequency of the distortion signal.

8. An apparatus comprising:
an analog front-end of a wireless radio receiver coupled to receive an inbound signal, down-convert the inbound signal, generate an in-phase (I) component and a quadrature (Q) component of a down-converted signal, filter the down-converted I and Q signals, convert the down-converted I and Q signals from an analog format to a digital format and output digital baseband I and Q signals;

an envelope detector coupled to receive the inbound signal and to detect an amplitude modulated envelope of the inbound signal that includes both a desired signal and a distortion signal, the envelope detector providing a detector output that is indicative of the amplitude modulated envelope of the inbound signal; and a baseband module coupled to receive the digital baseband I and Q signals and a digital format of the detector output from the envelope detector, to process the output from the envelope detector to estimate second order nonlinearity and third order nonlinearity distortions caused by nonlinear characteristics of the radio receiver in receiving both the desired signal and the distortion signal in the inbound signal, generate first coefficients to cancel the second order nonlinearity and third order nonlinearity distortions and apply the first coefficients with second coefficients that are used to cancel I/Q imbalance at an I/Q imbalance correction stage to substantially cancel the second order nonlinearity and third order nonlinearity distortions when baseband processing the baseband I and Q outputs in the baseband module.

9. The apparatus of claim 8, further including a filter coupled to receive and filter the detector output and further including an analog-to-digital converter coupled to convert a filtered detector output to the digital format of the detector output coupled to the baseband module.

10. The apparatus of claim 9, wherein the baseband module includes a digital-signal- processor (DSP) to perform baseband processing.

11. The apparatus of claim 10, wherein training symbols are utilized to generate the first coefficients to cancel the second order nonlinearity and third order nonlinearity distortions.

12. The apparatus of claim 10, wherein when estimating the second order nonlinearity and third order nonlinearity distortions, estimates of the second order nonlinearity and third order nonlinearity distortions are independent of a frequency of the distortion signal.

13. The apparatus of claim 10, wherein the envelope detector is a non-coherent amplitude modulation detector.

14. The apparatus of claim 10, wherein the desired signal is at a low-frequency level after down-conversion and the second order nonlinearity is determined as a low-frequency signal component of the distortion signal after down-conversion.

15. The apparatus of claim 10, wherein the third order nonlinearity is determined as a low-frequency signal component that results from inter-modulation of the desired signal with a low-frequency signal component of the distortion signal after down-conversion.

16. A method comprising:
receiving an inbound signal at a front-end of a wireless radio receiver, in which the inbound signal includes both a desired signal and a distortion signal;
down-converting the inbound signal to generate an in-phase (I) component and a quadrature (Q) component of a down-converted signal;
filtering the down-converted I and Q signals;
converting filtered down-converted I and Q signals from an analog format to digital baseband I and Q signals for baseband processing;
detecting an amplitude modulated envelope of the inbound signal and providing a detected output that is indicative of the amplitude modulated envelope;
filtering the output that is indicative of the amplitude modulated envelope;
converting filtered output that is indicative of the amplitude modulated envelope for baseband processing;
processing at baseband the output that is indicative of the amplitude modulated envelope to generate first coefficients to cancel second order nonlinearity and third order nonlinearity distortions caused by nonlinear characteristics of the radio receiver in receiving both the desired signal and the distortion signal; and
applying the first coefficients at an I/Q imbalance correction stage of baseband processing to substantially cancel the distortion signal when baseband processing the baseband I and Q outputs in the baseband module.

17. The method of claim 16, wherein detecting the amplitude modulated envelope of the inbound signal utilizes envelope detection to detect an amplitude modulated envelope.

18. The method of claim 17, further comprising using training symbols to generate the first coefficients to cancel the second order nonlinearity and third order nonlinearity.

19. The method of claim 17, wherein applying the first coefficients to cancel second order nonlinearity and third order nonlinearity distortions at baseband processing combines the first coefficients to cancel second order nonlinearity and third order nonlinearity distortions with second coefficients that are used for correcting an I/Q imbalance and applying both the first and second coefficients at the I/Q imbalance correction stage during baseband processing.

20. The method of claim 17, wherein applying the first coefficients to cancel second order nonlinearity and third order nonlinearity distortions at baseband processing combines the first coefficients to cancel second order nonlinearity and third order nonlinearity distortions with second coefficients for correcting an in-phase imbalance and applying both the first and second coefficients at the I/Q imbalance correction stage during baseband processing.

* * * * *